United States Patent
Abedini et al.

(10) Patent No.: US 11,765,569 B2
(45) Date of Patent: Sep. 19, 2023

(54) MOBILITY HISTORY REPORTING BY A WIRELESS SERVING NODE

(71) Applicant: QUALCOMM Incorporated, San Diego, CA (US)

(72) Inventors: Navid Abedini, Basking Ridge, NJ (US); Ozcan Ozturk, San Diego, CA (US); Gavin Bernard Horn, La Jolla, CA (US); Tao Luo, San Diego, CA (US); Junyi Li, Franklin Park, NJ (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 29 days.

(21) Appl. No.: 17/191,397

(22) Filed: Mar. 3, 2021

(65) Prior Publication Data

US 2021/0306840 A1    Sep. 30, 2021

Related U.S. Application Data

(60) Provisional application No. 63/000,192, filed on Mar. 26, 2020.

(51) Int. Cl.
*H04W 4/00* (2018.01)
*H04W 8/08* (2009.01)
(Continued)

(52) U.S. Cl.
CPC ......... *H04W 8/08* (2013.01); *H04W 36/0083* (2013.01); *H04W 36/00835* (2018.08); *H04W 64/006* (2013.01)

(58) Field of Classification Search
CPC ..... H04W 8/02; H04W 8/08; H04W 36/0083; H04W 36/00835; H04W 36/00837;
(Continued)

(56) References Cited

U.S. PATENT DOCUMENTS

| | | | | |
|---|---|---|---|---|
| 2010/0317349 A1* | 12/2010 | Serravalle | ............. | H04W 24/10 |
| | | | | 455/456.6 |
| 2013/0017776 A1* | 1/2013 | Takano | ................... | H04B 7/155 |
| | | | | 455/7 |

(Continued)

FOREIGN PATENT DOCUMENTS

EP    3477970 A1    5/2019

OTHER PUBLICATIONS

Erik D., et al., "5G Evolution and Beyond", 2019 IEEE 20th International Workshop on Signal Processing Advances in Wireless Communications (SPAWC), IEEE, Jul. 2, 2019 (Jul. 2, 2019), pp. 1-5, XP033605738, DOI: 10.1109/SPAWC.2019.8815418 [retrieved on Aug. 26, 2019] the whole document.
(Continued)

*Primary Examiner* — Matthew W Genack
(74) *Attorney, Agent, or Firm* — Harrity & Harrity, LLP

(57) ABSTRACT

Various aspects of the present disclosure generally relate to wireless communication. In some aspects, a wireless serving node may determine mobility history information associated with the wireless serving node, wherein the mobility history information is associated with a relative mobility between the wireless serving node and one or more reported cells; and transmit, to a child node of the wireless serving node, the mobility history information associated with the wireless serving node. Numerous other aspects are provided.

30 Claims, 7 Drawing Sheets

(51) Int. Cl.
*H04W 64/00* (2009.01)
*H04W 36/00* (2009.01)

(58) Field of Classification Search
CPC ..... H04W 36/16; H04W 36/18; H04W 40/22; H04W 52/46; H04W 64/006; H04W 88/04
See application file for complete search history.

(56) References Cited

U.S. PATENT DOCUMENTS

| | | | |
|---|---|---|---|
| 2016/0302143 A1* | 10/2016 | Karlsson | H04B 17/318 |
| 2019/0313235 A1* | 10/2019 | Miklós | H04W 76/25 |
| 2020/0314851 A1* | 10/2020 | Vaidya | H04W 16/14 |
| 2021/0112416 A1* | 4/2021 | Gonzalez Escudero | H04W 76/11 |
| 2021/0227435 A1* | 7/2021 | Hsieh | H04W 36/08 |

OTHER PUBLICATIONS

Huawei: "UE History Information in MR-DC", (TP for SON BLCR for 38.423), 3GPP Draft, 3GPP TSG-RAN WG3 Meeting #110-e, R3-206188, 3rd Generation Partnership Project (3GPP), Mobile Competence Centre, 650, Route Des Lucioles, F-06921 Sophia-Antipolis Cedex, France, vol. RAN WG3, No. E-meeting, Nov. 2, 2020-Nov. 23, 2020, Oct. 22, 2020 (Oct. 22, 2020), XP051941645, 23 Pages, Retrieved from the Internet: URL: https://ftp.3gpp.org/tsg_ran/WG3_lu/TSGR3_110-e/Docs/R3-206188.zip. R3-206188.docx [retrieved on Oct. 22, 2020] p. 1-p. 3 p. 23.
International Search Report and Written Opinion—PCT/US2021/070234—ISA/EPO—dated Jun. 16, 2021.

* cited by examiner

MOBILITY HISTORY REPORTING BY A WIRELESS SERVING NODE

CROSS-REFERENCE TO RELATED APPLICATION

This Patent Application claims priority to U.S. Provisional Patent Application No. 63/000,192, filed on Mar. 26, 2020, entitled "MOBILITY HISTORY REPORTING BY A WIRELESS SERVING NODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for mobility history reporting by a wireless serving node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a first wireless node comprising a wireless serving node, may include determining mobility history information associated with the wireless serving node, wherein the mobility history information is associated with a relative mobility between the wireless serving node and one or more reported cells; and transmitting, to a second wireless node, the mobility history information associated with the wireless serving node.

In some aspects, a method of wireless communication, performed by a wireless serving node, may include receiving, from a parent node of the wireless serving node, mobility history information associated with the parent node, wherein the mobility history information is associated with a relative mobility between the parent node and one or more reported cells; and performing an action based at least in part on receiving the mobility history information associated with the parent node.

In some aspects, a first wireless node comprising a wireless serving node for wireless communication may include a memory and one or more processors operatively coupled to the memory. The memory and the one or more processors may be configured to determine mobility history information associated with the wireless serving node, wherein the mobility history information is associated with a relative mobility between the wireless serving node and one or more reported cells; and transmit, to a child node of the wireless serving node, the mobility history information associated with the wireless serving node.

In some aspects, a wireless serving node for wireless communication may include a memory and one or more processors operatively coupled to the memory. The memory and the one or more processors may be configured to receive, from a parent node of the wireless serving node, mobility history information associated with the parent node, wherein the mobility history information is associated with a relative mobility between the parent node and one or more reported cells; and perform an action based at least in part on receiving the mobility history information associated with the parent node.

In some aspects, a non-transitory computer-readable medium may store one or more instructions for wireless communication. The one or more instructions, when executed by one or more processors of a wireless serving node, may cause the one or more processors to determine mobility history information associated with the wireless serving node, wherein the mobility history information is associated with a relative mobility between the wireless serving node and one or more reported cells; and transmit, to a child node of the wireless serving node, the mobility history information associated with the wireless serving node.

In some aspects, a non-transitory computer-readable medium may store one or more instructions for wireless communication. The one or more instructions, when executed by one or more processors of a wireless serving node, may cause the one or more processors to receive, from a parent node of the wireless serving node, mobility history information associated with the parent node, wherein the mobility history information is associated with a relative mobility between the parent node and one or more reported cells; and perform an action based at least in part on receiving the mobility history information associated with the parent node.

In some aspects, an apparatus for wireless communication may include means for determining mobility history information associated with the apparatus, wherein the mobility history information is associated with a relative mobility between the apparatus and one or more reported cells; and means for transmitting, to a child node of the apparatus, the mobility history information associated with the apparatus.

In some aspects, an apparatus for wireless communication may include means for receiving, from a parent node of the apparatus, mobility history information associated with the parent node, wherein the mobility history information is associated with a relative mobility between the parent node and one or more reported cells; and means for performing an action based at least in part on receiving the mobility history information associated with the parent node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
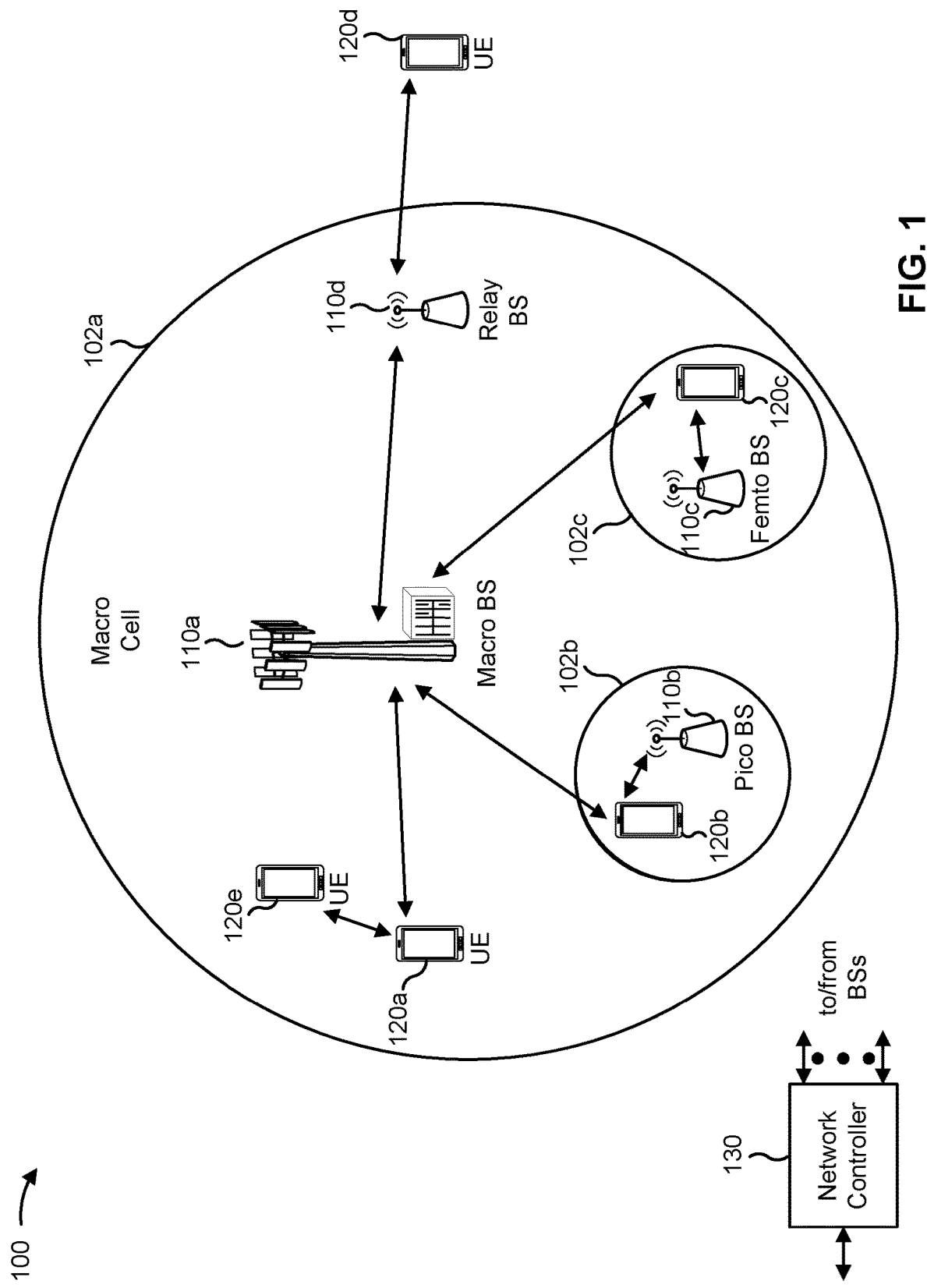
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
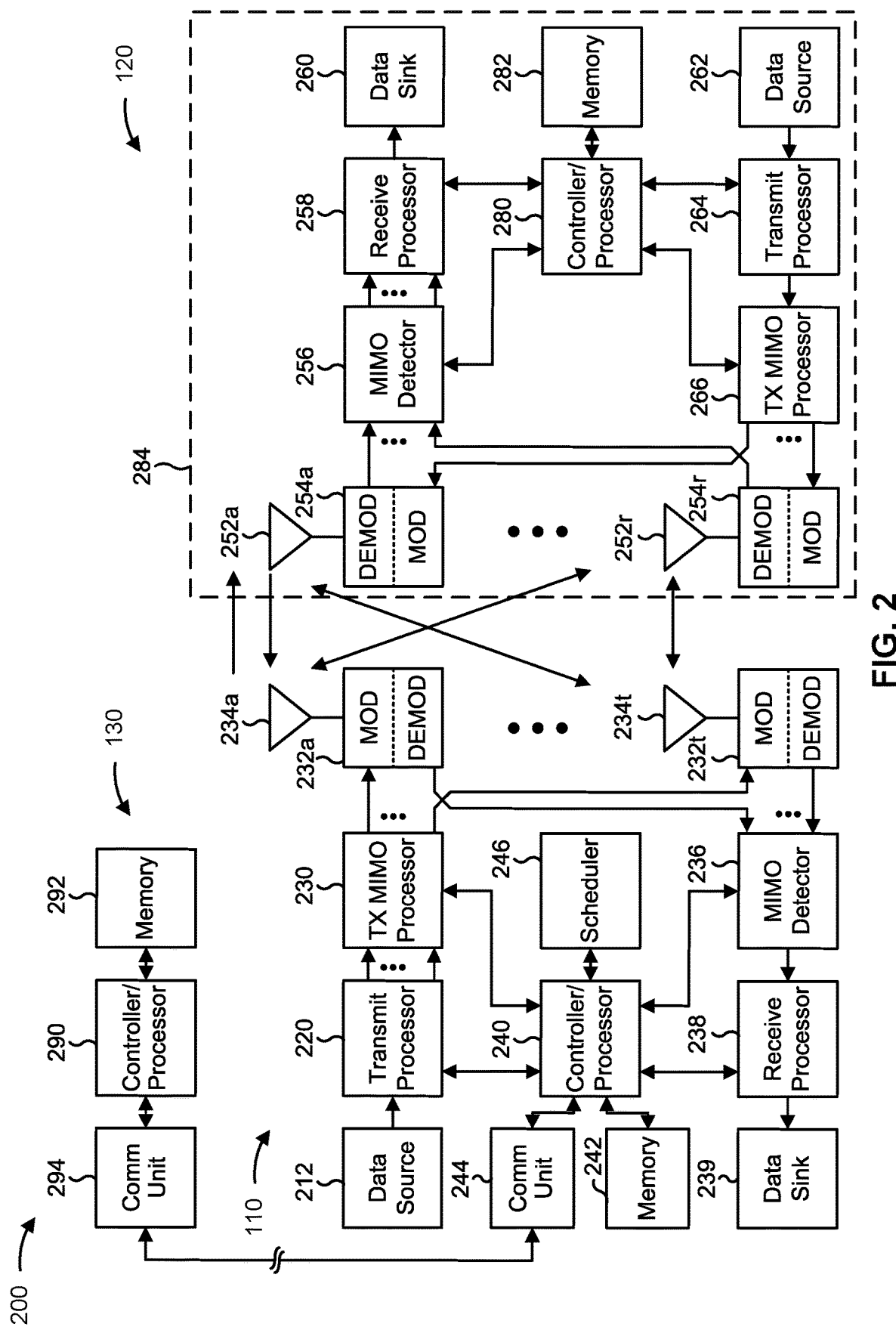
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with mobility history reporting by a wireless serving node, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a first wireless node comprising a wireless serving node may include means for determining mobility history information associated with the wireless serving node, wherein the mobility history information is associated with a relative mobility between the wireless serving node and one or more reported cells, means for transmitting, to a second wireless node, mobility history information associated with the wireless serving node, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless serving node may include means for receiving, from a parent node of the wireless serving node, mobility history information associated with the parent node, wherein the mobility history information is associated with a relative mobility between the parent node and one or more reported cells, means for performing an action based at least in part on receiving the mobility history information associated with the parent node, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
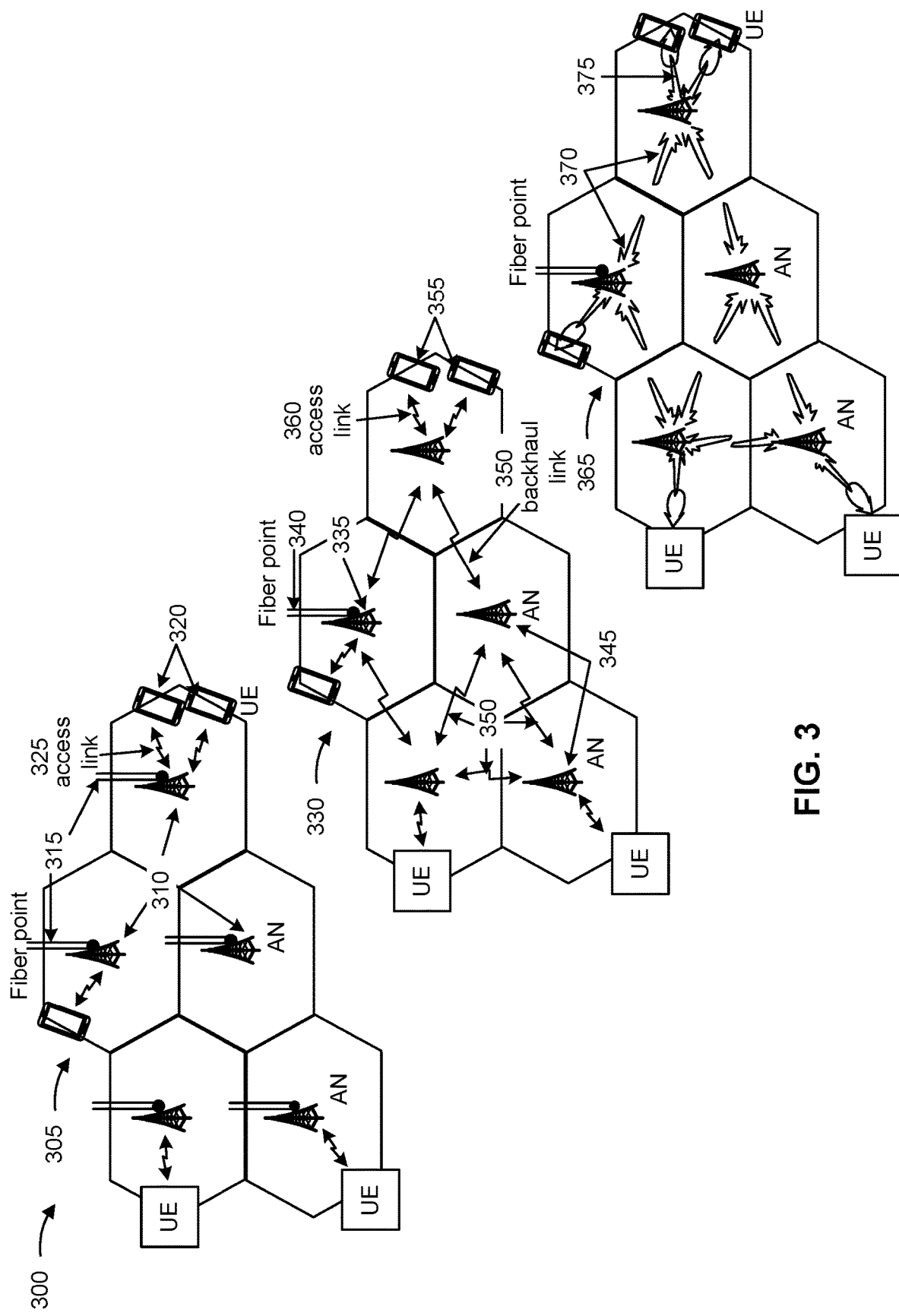
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
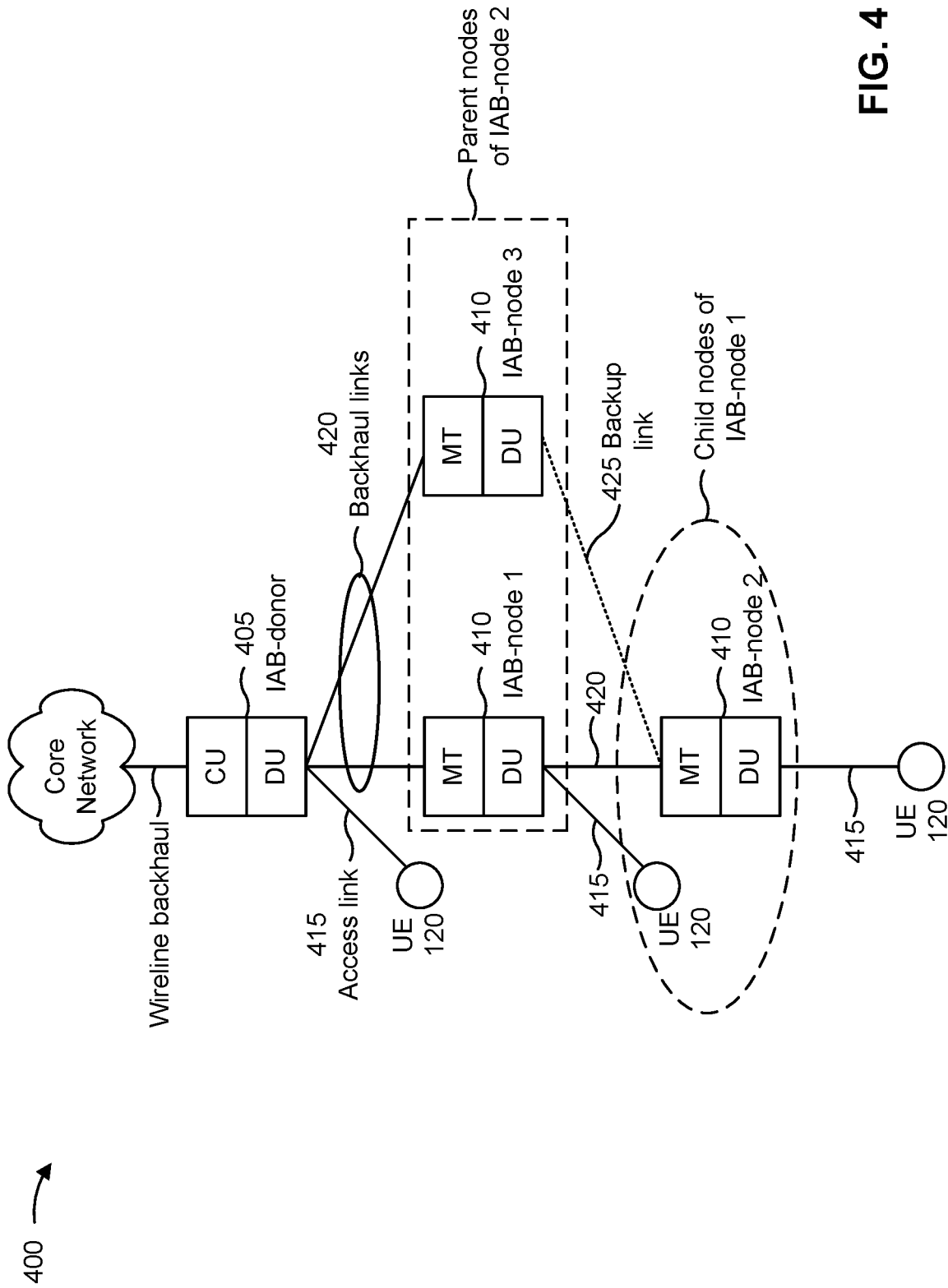
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

In an IAB network, network resources for wireless communications (e.g., time resources, frequency resources, spatial resources, and/or the like) may be shared between a parent link 425 of an IAB node 410 (shown as link 420/425 for IAB-node 1) and a child link 430 of the IAB node 410 (shown as link 420/430 for IAB-node 1). When an IAB node 410 uses time division multiplexing (TDM) between a parent link 425 and a child link 430, the IAB node 410 is subject to a half duplex constraint, meaning that the IAB node 410 cannot transmit and receive information at the same time (e.g., cannot concurrently communicate via a parent link 425 of the IAB node 410 and a child link 430 of the IAB node 410). This constraint may lead to high latency for communications.

To reduce latency, increase robustness, and expand coverage of an IAB network, the IAB network may be overdeployed. For example, there may be multiple IAB donors 405 and/or IAB nodes 410 with overlapping coverage, there may be multiple routes from a particular UE 120 and/or IAB node 410 to another IAB node and/or to the IAB donor 405, and/or the like. For example, because millimeter wave communications have high signal attenuation during propagation, IAB nodes 410 with overlapping coverage may be deployed to expand coverage in the IAB network and mitigate such signal attenuation. Furthermore, because millimeter wave communications are susceptible to link blockage and link failure, IAB nodes 410 with overlapping coverage may be deployed to improve robustness of the IAB network.

In some cases, to improve reliability of transmissions in an IAB network, packets may be transmitted to a destination (e.g., an IAB node, an IAB donor, a UE, and/or the like) along multiple paths. For example, PDCP duplication may be employed at the CU and/or the UE to improve reliability. However, PDCP duplication results in large overhead. Some techniques and apparatuses described herein enable network coding to be used in an IAB network. Network coding improves reliability while using less resource overhead than PDCP duplication.

As indicated above, FIG. 4 is provided as an example. Other examples may differ from what is described with regard to FIG. 4.

In LTE, a UE, if capable, may keep track of the cells that the UE has camped on while in idle and/or connected mode. This sort of mobility history information may be reported to the network, which may use the information to better estimate the mobility state of the UE and adjust the UE's parameters accordingly. The network may leverage the submitted information for more efficient network planning and management, as well. NR has also been developed to include a similar procedure for a UE to submit mobility history information.

In NR, and as part of mobile IAB, NR networks may have cells that are mobile—cells that may be moving. It has been recognized that having a reliable estimation of relative mobility state between a user and a cell may be useful for optimizing various signaling and procedures. For example, it has been proposed that available mobility information and measurements may be used to classify different users and/or their UEs based on their relative mobility to a given cell. This classification may be used, for example, to prioritize service and resource management to one group versus another, to set various parameters optimally for operation of different groups, and/or the like.

In some aspects of the techniques and apparatuses described herein, a wireless serving node (e.g., a wireless node, a base station, a mobile base station, a child node, a parent node, and/or the like) may transmit a mobility history report to a child node (e.g., a UE, a wireless node, a base station, a mobile base station, and/or the like). The mobility history report may include mobility history information that may be used by a wireless node and/or the network for selection of cells, management of mobile cells and corresponding resources, and/or the like. In some aspects, the mobility history information may include an entry time corresponding to a time at which the wireless serving node entered a visited cell, an exit time corresponding to a time at which the wireless serving node exited the visited cell, a duration of time for which the wireless serving node visited the cell, and/or the like. In this way, aspects of the techniques described herein may facilitate tracking of patterns of activity of the wireless serving node, which may facilitate more efficient management of resources allocated by and/or to the wireless serving node.

In some aspects, the mobility history information may include mobility state information associated with the wireless serving node. In some aspects, the mobility state information associated with the wireless serving node may include planned mobility state information. Planned mobility state information may include information associated with planned and/or predicted future mobility of the wireless serving node. In some aspects, planned mobility state information may include a duration of time that a cell provided by the wireless serving node will have a current motion state, a next motion state of the cell, a next level of mobility, and/or the like. In this way, a child node and/or other network nodes may use planned and/or predicted mobility state information to more efficiently allocate resources, perform handovers, perform cell reselections, and/or the like.

Figure 5:
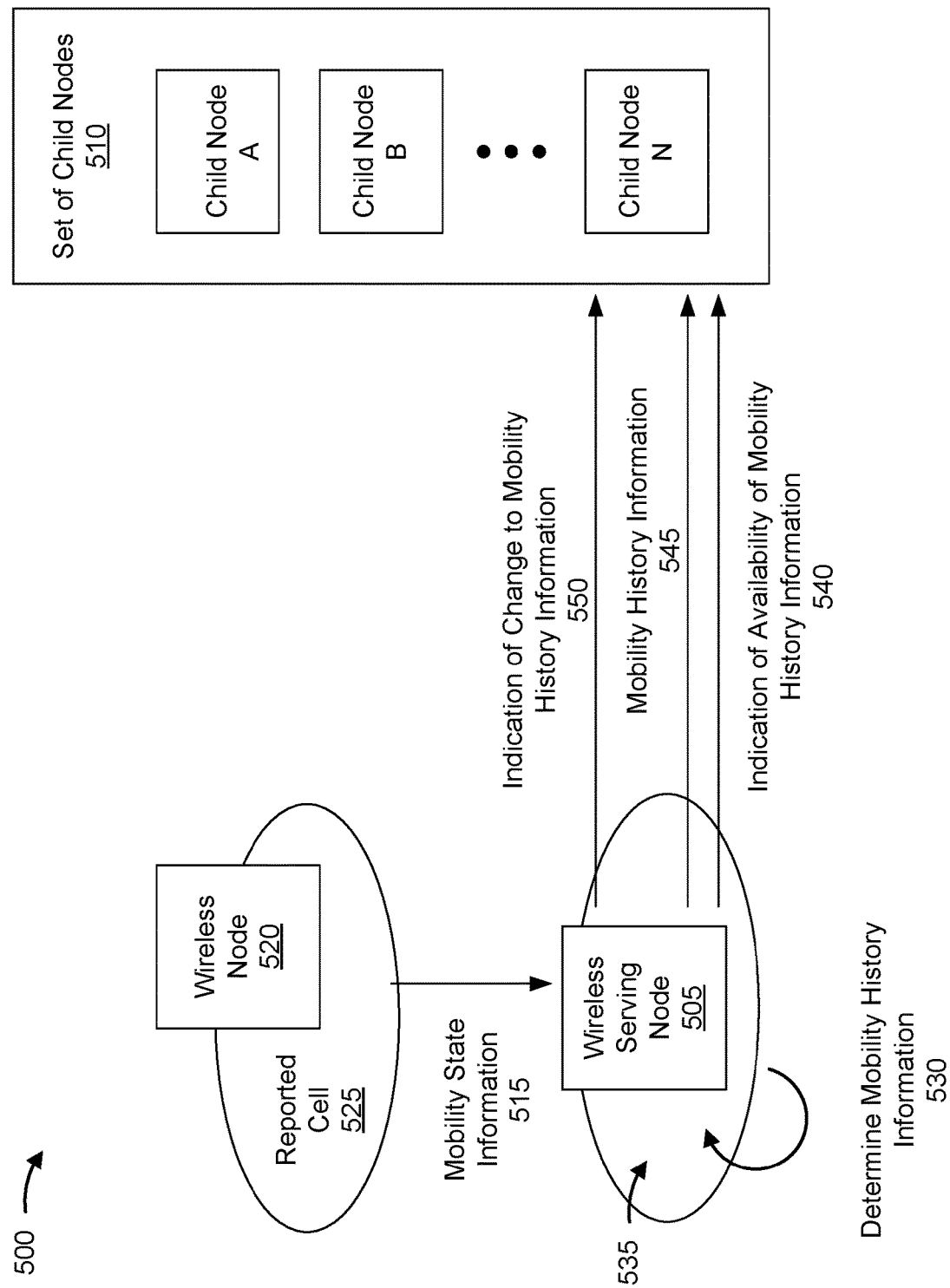
FIG. 5 is a diagram illustrating an example of mobility history reporting, in accordance with the present disclosure.

FIG. 5 is a diagram illustrating an example 500 of mobility history reporting, in accordance with the present disclosure. As shown, a wireless serving node 505 may communicate with a set 510 of child nodes (shown as "child node A," "child node B," . . . "child node N").

In some aspects, the wireless serving node 505 may be a parent node of the set 510 of child nodes. In some aspects, the wireless serving node 505 may include a UE, a DU of an IAB node, an MT component of an IAB node, and/or the like. In some aspects, a child node of the set 510 of child nodes may include a UE, a DU of an IAB node, an MT component of an IAB node, and/or the like.

As shown by reference number 515, a wireless node 520 that provides a reported cell 525 may transmit, and the wireless serving node 505 may receive, mobility state information associated with the reported cell 525. A reported cell 525 may include a cell about which the wireless serving node 505 reports mobility history information to one or more child nodes of the set 510 of child nodes.

The wireless serving node 505 may report mobility history information associated with any number of reported cells. Reported cells may include mobile cells, stationary cells, cells that the wireless serving node 505 has visited, neighboring cells that have been detected by a visited cell and/or the wireless serving node 505, and/or the like. In some aspects, the wireless serving node 505 may be a mobile wireless IAB node and the reported cell 525 may be a cell on which the wireless serving node 505 camped. A cell on which the wireless serving node 505 camped may include a cell that the wireless serving cell visited for a duration of time that satisfies a camping threshold.

In some aspects, the mobility state information may indicate a cell ID associated with the reported cell 525, a motion state of the reported cell 525, a level of mobility of the reported cell, and/or the like. The motion state and/or the level of mobility may correspond to a particular point in time, a particular period of time, and/or the like. A motion state of the reported cell 525 may indicate whether the reported cell 525 is (or was) mobile or stationary. A level of mobility of the reported cell 525 may indicate a speed of motion of the reported cell 525. In some aspects, a level of mobility may indicate whether the reported cell 525 is, or was, moving at one of a set of defined speeds or speed ranges. In some aspects, the set of defined speeds or speed ranges may include slow, medium, and fast.

As shown by reference number 530, the wireless serving node 505 may determine mobility history information associated with the wireless serving node 505. In some aspects, the mobility history information may be associated with a relative mobility between the wireless serving node 505 and one or more reported cells 525. In some aspects, the mobility history information may indicate a cell ID associated with the reported cell 525, a duration of time for which the wireless serving node 505 visited the reported cell 525, an entry time corresponding to a time at which the wireless serving node 505 entered the reported cell 525, an exit time corresponding to a time at which the wireless serving node 505 exited the reported cell 525, mobility state information associated with the reported cell 525, and/or the like. In some aspects, the mobility history information may include the mobility state information associated with the reported cell 525.

As indicated above, the reported cell may include a detected neighboring cell. The detected neighboring cell may be a neighboring cell with respect to a visited cell, another detected cell, a cell 535 provided by the wireless serving node 505, and/or the like. In some aspects, the mobility history information may indicate a cell ID associated with a detected neighboring cell, a duration of time for which the detected neighboring cell has been detectable, and/or the like.

In some aspects, the mobility history information may indicate a node ID associated with one or more child nodes of the set 510 of child nodes, a duration of time for which a child node has been visiting the cell 535 provided by the wireless serving node 505, one or more additional node IDs associated with one or more additional child nodes of the wireless serving node 505, a duration of time, corresponding to an additional child node, for which the additional child node has been connected to the cell 535 provided by the wireless serving node 505, and/or the like.

In some aspects, the mobility history information may indicate mobility state information associated with the wireless serving node 505. In some aspects, the mobility state information associated with the wireless serving node 505 may indicate a motion state of the cell 535 provided by the wireless serving node 505, wherein the motion state indicates whether the cell 535 provided by the wireless serving node 505 is (or was) mobile or stationary, a level of mobility of the cell 535 provided by the wireless serving node 505, and/or the like.

In some aspects, the mobility state information associated with the wireless serving node 505 may include historical mobility state information. The historical mobility state information may indicate a change in a motion state of the cell 535 provided by the wireless serving node 505, a time corresponding to the change in the motion state of the cell 535 provided by the wireless serving node 505, a change in a level of mobility of the cell 535 provided by the wireless serving node 505, a time corresponding to the change in the level of mobility of the cell 535 provided by the wireless serving node 505, and/or the like.

In some aspects, the mobility state information associated with the wireless serving node 505 may include planned mobility state information. The planned mobility state information may indicate a duration of time that the cell 535 provided by the wireless serving node 505 will have a current motion state, a minimum duration of time that the cell 535 provided by the wireless node 505 will have a current motion state, a maximum duration of time that the cell 535 provided by the wireless node 505 will have a current motion state, a next motion state to which the cell 535 provided by the wireless node 505 will change, a duration of time that the cell 535 provided by the wireless node 505 will have the next motion state, a minimum duration of time that the cell 535 provided by the wireless node 505 will have the next motion state, a maximum duration of time that the cell 535 provided by the wireless node 505 will have the next motion state, a duration of time that the cell 535 provided by the wireless node 505 will have a current level of mobility, a next level of mobility to which the cell 535 provided by the wireless node 505 will change, a duration of time that the cell 535 provided by the wireless node 505 will have the next level of mobility, a minimum duration of time that the cell 535 provided by the wireless node 505 will have the next level of mobility, a maximum duration of time that the cell 535 provided by the wireless node 505 will have the next level of mobility, and/or the like.

In some aspects, the planned mobility state information may indicate motion direction information associated with the cell 535 provided by the wireless node 505, a cell ID associated with a next expected cell to be visited by the wireless serving node 505, and/or the like. In some aspects, the wireless serving node 505 may determine the next expected cell based at least in part on motion direction information associated with repeated travel, by the wireless serving node 505, along a particular route.

As shown by reference number 540, the wireless serving node 505 may transmit, and one or more of the set 510 of child nodes may receive, an indication that mobility history information is available. The indication may be carried in a system information block (SIB). In some aspects, the SIB may be a SIB 1.

As shown by reference number 545, the wireless serving node 505 may transmit, and one or more of the set 510 of child nodes may receive, the mobility history information. In some aspects, transmitting the mobility history information may include broadcasting the mobile history information in a SIB. In some aspects, the SIB may include a legacy SIB or a new dedicated SIB. In some aspects, the mobility history information may be carried in a radio resource control (RRC) message.

In some aspects, the wireless serving node 505 may transmit the mobility history information to a subset of the set 510 of child nodes. In some aspects, the subset of child nodes may include fewer than all of the child nodes in the set 510 of child nodes. In some aspects, the subset of child nodes may include one or more child IAB nodes of the set 510 of child nodes. In some aspects, the wireless serving node 505 may transmit the mobility history information to a wireless node other than a child node of the wireless serving node 505.

As shown by reference number 550, the wireless serving node 505 may transmit, and one or more of the set 510 of child nodes may receive, an indication of a change to the mobility history information. In some aspects, the wireless serving node 505 may determine that one or more aspects of the mobility history information has changed since the information was transmitted to one or more child nodes. For example, a mobility state of a reported cell may indicate that the reported cell is stationary. After transmitting the mobility state information to a child node, the wireless serving node may determine that the reported cell has begun to move, in which case the mobility state of that reported cell has changed. The wireless serving node 505 may transmit an indication of the change to the child node, where the indication indicates that the reported cell is in motion. In some aspects, the indication of the change to the mobility history information may be carried in downlink control information (DCI), a medium access control (MAC) control element (MAC-CE), and/or the like.

In some aspects, the mobility history information may be carried in a SIB and the indication of the change to the mobility history information may be carried in a dedicated system information (SI) update. In some aspects, the dedicated SI update may be transmitted to each child node of the set 510 of child nodes. In some aspects, the dedicated SI update may be transmitted to a subset of the set 510 of child nodes. The subset of the set 510 of child nodes may include fewer than all of the child nodes of the set 510 of child nodes. In some aspects, the dedicated SI update may be transmitted using a short message.

In some aspects, the dedicated SI update may be transmitted using an extended SI update indication. The extended SI update indication may include a dedicated short message. In some aspects, the extended SI update indication may include a dedicated paging radio network temporary identifier (RNTI), one or more dedicated physical downlink control channel (PDCCH) resources, dedicated content of a legacy short message, a legacy short message in which one or more reserved bits are used for the dedicated SI update, a legacy short message in which one or more unused bits are used for the dedicated SI update, and/or the like.

In some aspects, the extended SI update indication may be carried in a paging physical downlink shared channel (PDSCH). In some aspects, the extended SI update indication may indicate that a SIB carrying mobility history information has been updated. In some aspects, the change to the mobility history information may be explicitly indicated in the paging PDSCH.

According to various aspects, some wireless serving nodes 505 may support the mobility history information reporting, while others may not. In some aspects, the wireless serving node 505 supports mobility history information reporting based at least in part on the wireless serving node 505 comprising a distributed unit of a wireless IAB node. In some aspects, the wireless serving node may be a mobile wireless node, and the wireless serving node 505 may support mobility history information reporting based at least in part on the wireless serving node 505 comprising a DU of a mobile wireless IAB node.

As indicated above, FIG. 5 is provided as an example. Other examples may differ from what is described with respect to FIG. 5.

Figure 6:
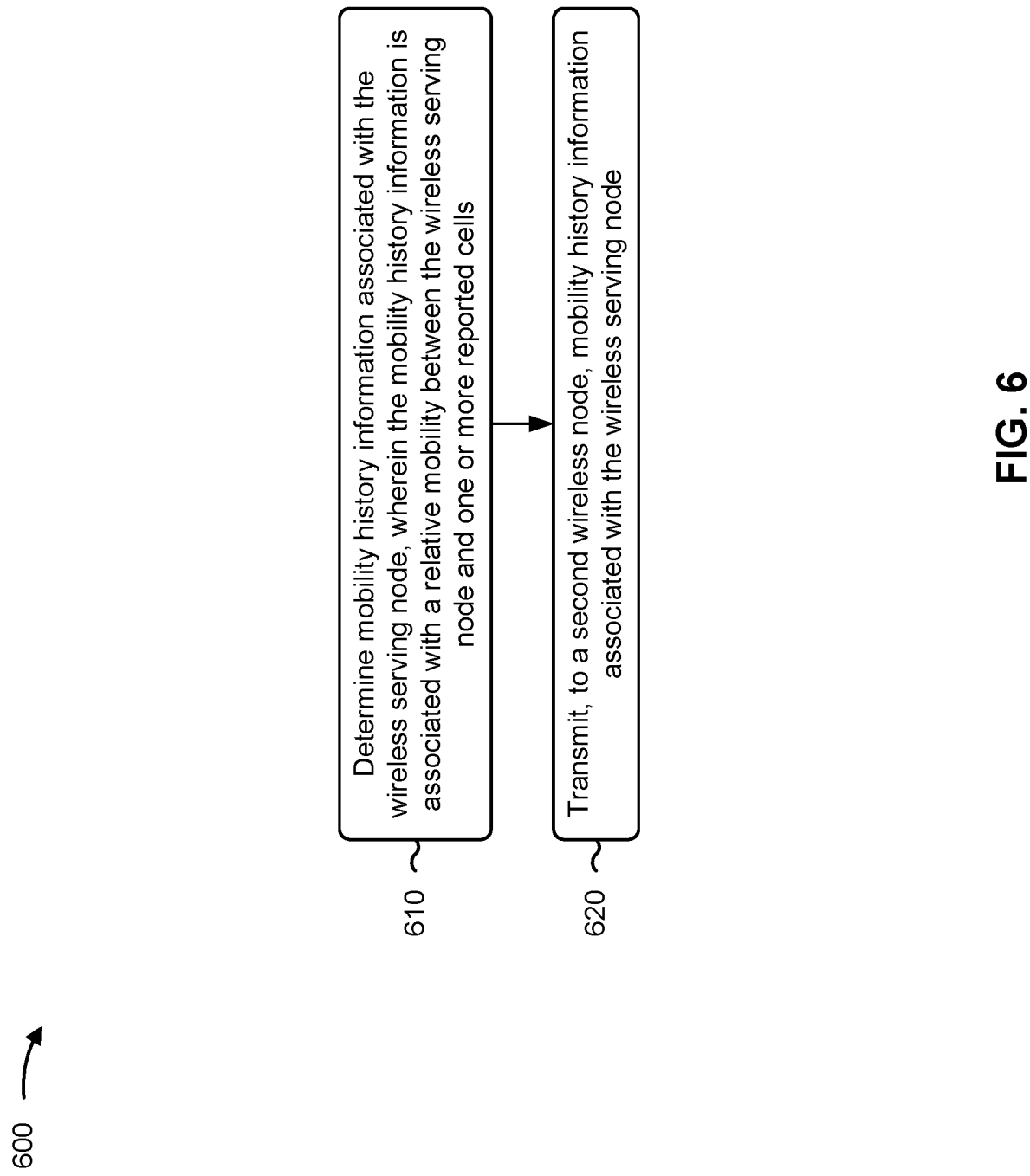
FIGS. 6 and 7 are diagrams illustrating example processes performed, for example, by wireless nodes, in accordance with the present disclosure.

FIG. 6 is a diagram illustrating an example process 600 performed, for example, by a wireless serving node, in accordance with the present disclosure. Example process 600 is an example where the wireless serving node (e.g., wireless serving node 505, base station 110, UE 120, and/or the like) performs operations associated with mobility history reporting by a wireless serving node.

As shown in FIG. 6, in some aspects, process 600 may include determining mobility history information associated with the wireless serving node, wherein the mobility history information is associated with a relative mobility between the wireless serving node and one or more reported cells (block 610). For example, the wireless serving node (e.g., using receive processor 238, receive processor 258, controller/processor 240, controller/processor 280, memory 242, memory 282, and/or the like) may determine mobility history information associated with the wireless serving node, as described above. In some aspects, the mobility history information is associated with a relative mobility between the wireless serving node and one or more reported cells.

As further shown in FIG. 6, in some aspects, process 600 may include transmitting, to a second wireless node, the mobility history information associated with the wireless serving node (block 620). For example, the wireless serving node (e.g., using transmit processor 220, transmit processor 264, controller/processor 240, controller/processor 280, memory 242, memory 282, and/or the like) may transmit, to a second wireless node, the mobility history information associated with the wireless serving node, as described above.

Process 600 may include additional aspects, such as any single aspect or any combination of aspects described below and/or in connection with one or more other processes described elsewhere herein.

In a first aspect, the wireless serving node determines the mobility history information based at least in part on the wireless serving node comprising a distributed unit of a wireless integrated access and backhaul node.

In a second aspect, alone or in combination with the first aspect, the wireless serving node is a mobile wireless node, and the wireless serving node determines the mobility history information based at least in part on the wireless serving node comprising a distributed unit of a mobile wireless integrated access and backhaul node.

In a third aspect, alone or in combination with one or more of the first and second aspects, transmitting the mobility history information comprises broadcasting the mobile history information in a SIB.

In a fourth aspect, alone or in combination with the third aspect, the SIB comprises a legacy SIB or a dedicated SIB.

In a fifth aspect, alone or in combination with one or more of the first through fourth aspects, process 600 includes transmitting an indication that the mobility history information is available.

In a sixth aspect, alone or in combination with the fifth aspect, the indication is carried in a SIB.

In a seventh aspect, alone or in combination with one or more of the first through sixth aspects, the SIB comprises a SIB 1.

In an eighth aspect, alone or in combination with one or more of the first through seventh aspects, the second wireless node is a child node of the wireless serving node, and transmitting the mobility history information to the child node comprises transmitting the mobility history information to a subset of child nodes, of a set of child nodes, of the wireless serving node, the subset of child nodes comprises fewer than all of the child nodes in the set of child nodes.

In a ninth aspect, alone or in combination with the eighth aspect, the subset of child nodes comprises one or more child IAB nodes of the set of child nodes.

In a tenth aspect, alone or in combination with one or more of the first through ninth aspects, the mobility history information is carried in an RRC message.

In an eleventh aspect, alone or in combination with one or more of the first through tenth aspects, the wireless serving node is a mobile wireless IAB node, and the one or more reported cells comprise one or more visited cells.

In a twelfth aspect, alone or in combination with one or more of the first through eleventh aspects, the wireless serving node is a mobile wireless IAB node, and the one or more reported cells comprise one or more cells on which the wireless serving node camped, the one or more cells on which the wireless serving node camped comprise one or more cells that the wireless serving node visited for a duration of time that satisfies a camping threshold.

In a thirteenth aspect, alone or in combination with one or more of the first through twelfth aspects, the mobility history information indicates at least one of: a cell ID associated with a reported cell of the one or more reported cells, a duration of time for which the wireless serving node visited the reported cell, an entry time corresponding to a time at which the wireless serving node entered the reported cell, an exit time corresponding to a time at which the wireless serving node exited the reported cell, mobility state information associated with the reported cell, or a combination thereof.

In a fourteenth aspect, alone or in combination with one or more of the first through thirteenth aspects, the mobility history information indicates at least one of: a cell ID associated with a reported cell of the one or more reported cells, a motion state of the reported cell, wherein the motion state indicates whether the reported cell is mobile or stationary, a level of mobility of the reported cell, or a combination thereof.

In a fifteenth aspect, alone or in combination with one or more of the first through fourteenth aspects, the one or more reported cells comprise one or more detected neighboring cells, the one or more detected neighboring cells comprise cells neighboring a cell provided by the wireless serving node and that are detected by the wireless serving node.

In a sixteenth aspect, alone or in combination with the fifteenth aspect, the mobility history information indicates at least one of: a cell ID associated with a reported cell of the one or more reported cells, a duration of time for which the reported cell has been detectable, or a combination thereof.

In a seventeenth aspect, alone or in combination with one or more of the first through sixteenth aspects, the one or more reported cells comprises: one or more mobile cells, one or more stationary cells, or a combination thereof.

In an eighteenth aspect, alone or in combination with one or more of the first through seventeenth aspects, the mobility history information indicates at least one of: a node ID associated with the child node, a duration of time for which the child node has been visiting a cell provided by the wireless serving node, one or more additional node IDs associated with one or more additional child nodes of the wireless serving node, a duration of time, corresponding to an additional child node of the one or more additional child nodes of the wireless serving node, for which the additional child node has been connected to the cell provided by the wireless serving node, or a combination thereof.

In a nineteenth aspect, alone or in combination with one or more of the first through eighteenth aspects, the mobility history information indicates mobility state information associated with the wireless serving node.

In a twentieth aspect, alone or in combination with the nineteenth aspect, the mobility state information associated with the wireless serving node indicates at least one of: a motion state of a cell provided by the wireless serving node, wherein the motion state indicates whether the cell provided by the wireless serving node is mobile or stationary, a level of mobility of the cell provided by the wireless serving node, or a combination thereof.

In a twenty-first aspect, alone or in combination with one or more of the nineteenth through twentieth aspects, the mobility state information associated with the wireless serving node comprises historical mobility state information.

In a twenty-second aspect, alone or in combination with the twenty-first aspect, the historical mobility state information indicates at least one of a change in a motion state of a cell provided by the wireless serving node, wherein the motion state indicates whether the cell provided by the wireless serving node is mobile or stationary, a time corresponding to the change in the motion state of the cell provided by the wireless serving node, a change in a level of mobility of the cell provided by the wireless serving node, a time corresponding to the change in the level of mobility of the cell provided by the wireless serving node, or a combination thereof.

In a twenty-third aspect, alone or in combination with one or more of the nineteenth through twenty-second aspects, the mobility state information associated with the wireless serving node comprises planned mobility state information.

In a twenty-fourth aspect, alone or in combination with the twenty-third aspect, the planned mobility state information indicates at least one of: a duration of time that a cell provided by the wireless serving node will have a current motion state, a minimum duration of time that the cell provided by the wireless serving node will have a current motion state, a maximum duration of time that the cell provided by the wireless serving node will have a current motion state, a next motion state to which the cell provided by the wireless serving node will change, a duration of time that the cell provided by the wireless serving node will have the next motion state, a minimum duration of time that the cell provided by the wireless serving node will have the next motion state, a maximum duration of time that the cell provided by the wireless serving node will have the next motion state, a duration of time that the cell provided by the wireless serving node will have a current level of mobility, a next level of mobility to which the cell provided by the wireless serving node will change, a duration of time that the cell provided by the wireless serving node will have the next level of mobility, a minimum duration of time that the cell provided by the wireless serving node will have the next level of mobility, a maximum duration of time that the cell provided by the wireless serving node will have the next level of mobility, or a combination thereof.

In a twenty-fifth aspect, alone or in combination with one or more of the twenty-third through twenty-fourth aspects, the planned mobility state information indicates at least one of: motion direction information associated with a cell provided by the wireless serving node, a cell identifier associated with a next expected cell to be visited by the wireless serving node, or a combination thereof.

In a twenty-sixth aspect, alone or in combination with the twenty-fifth aspect, process 600 includes determining the next expected cell based at least in part on motion direction information associated with repeated travel, by the wireless serving node, along a particular route.

In a twenty-seventh aspect, alone or in combination with one or more of the first through twenty-sixth aspects, process 600 includes transmitting an indication of a change to the mobility history information.

In a twenty-eighth aspect, alone or in combination with the twenty-seventh aspect, the indication of the change to the mobility history information is carried in at least one of: DCI, a MAC-CE, or a combination thereof.

In a twenty-ninth aspect, alone or in combination with one or more of the twenty-seventh through twenty-eighth aspects, the mobility history information is carried in a SIB, and the indication of the change to the mobility history information is carried in a dedicated SI update.

In a thirtieth aspect, alone or in combination with the twenty-ninth aspect, the dedicated SI update is transmitted to: each child node of a set of child nodes of the wireless serving node, or a subset of the set of child nodes of the wireless serving node, wherein the subset of the set of child nodes includes fewer than all of the child nodes of the set of child nodes.

In a thirty-first aspect, alone or in combination with one or more of the twenty-ninth through thirtieth aspects, the dedicated SI update is transmitted using a short message.

In a thirty-second aspect, alone or in combination with one or more of the twenty-ninth through thirty-first aspects, the dedicated SI update is transmitted using an extended SI update indication.

In a thirty-third aspect, alone or in combination with the thirty-second aspect, the extended SI update indication comprises a dedicated short message.

In a thirty-fourth aspect, alone or in combination with the thirty-third aspect, the extended SI update indication comprises at least one of: a dedicated paging RNTI, one or more dedicated PDCCH resources, dedicated content of a legacy short message, a legacy short message in which one or more reserved bits are used for the dedicated SI update, a legacy short message in which one or more unused bits are used for the dedicated SI update, or a combination thereof.

In a thirty-fifth aspect, alone or in combination with one or more of the thirty-third through thirty-fourth aspects, the extended SI update indication is carried in a paging PDSCH.

In a thirty-sixth aspect, alone or in combination with the thirty-fifth aspect, the extended SI update indication indicates the SIB that has been updated.

In a thirty-seventh aspect, alone or in combination with one or more of the thirty-fifth through thirty-sixth aspects, the change to the mobility history information is explicitly indicated in the paging PDSCH.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
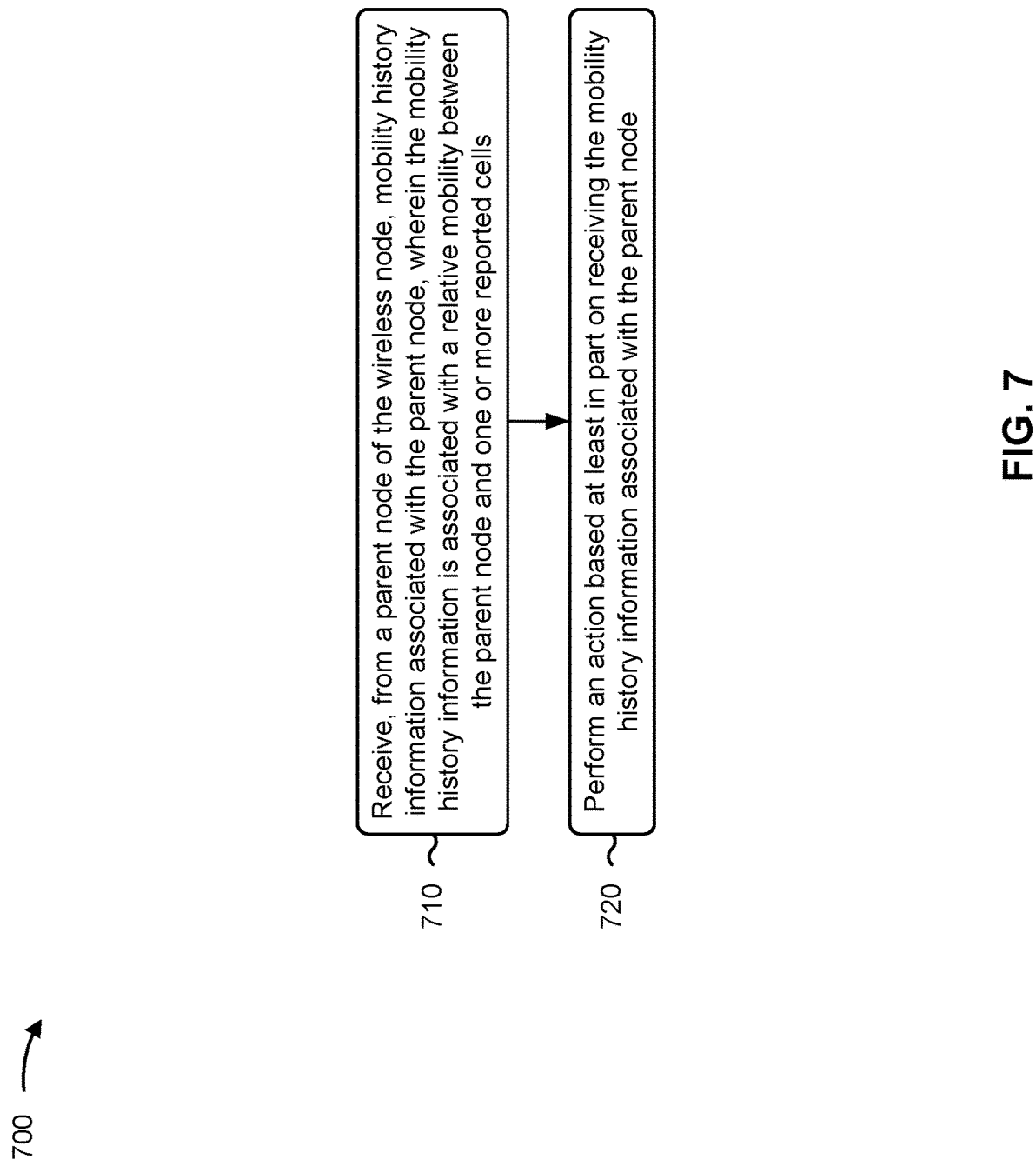

FIG. 7 is a diagram illustrating an example process 700 performed, for example, by a wireless serving node, in accordance with the present disclosure. Example process 700 is an example where the wireless serving node (e.g., wireless serving node 505, base station 110, UE 120, and/or the like) performs operations associated with mobility history reporting by a wireless serving node.

As shown in FIG. 7, in some aspects, process 700 may include receiving, from a parent node of the wireless serving node, mobility history information associated with the parent node, wherein the mobility history information is associated with a relative mobility between the parent node and one or more reported cells (block 710). For example, the wireless serving node (e.g., using receive processor 238, receive processor 258, controller/processor 240, controller/processor 280, memory 242, memory 282, and/or the like) may receive, from a parent node of the wireless serving node, mobility history information associated with the parent node, as described above. In some aspects, the mobility history information is associated with a relative mobility between the parent node and one or more reported cells.

As further shown in FIG. 7, in some aspects, process 700 may include performing an action based at least in part on receiving the mobility history information associated with the parent node (block 720). For example, the wireless serving node (e.g., using transmit processor 220, transmit processor 264, receive processor 238, receive processor 258, controller/processor 240, controller/processor 280, memory 242, memory 282, and/or the like) may perform an action based at least in part on receiving the mobility history information associated with the parent node, as described above.

Process 700 may include additional aspects, such as any single aspect or any combination of aspects described below and/or in connection with one or more other processes described elsewhere herein.

In a first aspect, the parent node determines the mobility history information based at least in part on the parent node comprising a distributed unit of a wireless integrated access and backhaul node.

In a second aspect, alone or in combination with the first aspect, the parent node is a mobile wireless node, and the parent node determines the mobility history information based at least in part on the parent node comprising a DU of a mobile wireless IAB node.

In a third aspect, alone or in combination with one or more of the first and second aspects, the mobility history information is broadcast in a SIB.

In a fourth aspect, alone or in combination with the third aspect, the SIB comprises a legacy SIB or a dedicated SIB.

In a fifth aspect, alone or in combination with one or more of the first through fourth aspects, process 700 includes receiving an indication that the mobility history information is available.

In a sixth aspect, alone or in combination with the fifth aspect, the indication is carried in a SIB.

In a seventh aspect, alone or in combination with the sixth aspect, the SIB comprises a SIB 1.

In an eighth aspect, alone or in combination with one or more of the first through seventh aspects, the wireless serving node comprises a child node of a subset of child nodes, of a set of child nodes, of the parent node, and the subset of child nodes comprises fewer than all of the child nodes in the set of child nodes.

In a ninth aspect, alone or in combination with the eighth aspect, the subset of child nodes comprises one or more child IAB nodes of the set of child nodes.

In a tenth aspect, alone or in combination with one or more of the first through ninth aspects, the mobility history information is carried in an RRC message.

In an eleventh aspect, alone or in combination with one or more of the first through tenth aspects, the parent node is a mobile wireless IAB node, and the one or more reported cells comprise one or more visited cells.

In a twelfth aspect, alone or in combination with one or more of the first through eleventh aspects, the parent node is a mobile wireless IAB node, and the one or more reported cells comprise one or more cells on which the parent node camped, the one or more cells on which the parent node camped comprise one or more cells that the parent node visited for a duration of time that satisfies a camping threshold.

In a thirteenth aspect, alone or in combination with one or more of the first through twelfth aspects, the mobility history information indicates at least one of: a cell ID associated with a reported cell of the one or more reported cells, a duration of time for which the parent node visited the reported cell, an entry time corresponding to a time at which the parent node entered the reported cell, an exit time corresponding to a time at which the parent node exited the reported cell, mobility state information associated with the reported cell, or a combination thereof.

In a fourteenth aspect, alone or in combination with one or more of the first through thirteenth aspects, the mobility history information indicates at least one of: a cell ID associated with a reported cell of the one or more reported cells, a motion state of the reported cell, wherein the motion state indicates whether the reported cell is mobile or stationary, a level of mobility of the reported cell, or a combination thereof.

In a fifteenth aspect, alone or in combination with one or more of the first through fourteenth aspects, the one or more reported cells comprise one or more detected neighboring cells, and the one or more detected neighboring cells comprise cells neighboring a cell provided by the parent node and that are detected by the parent node.

In a sixteenth aspect, alone or in combination with the fifteenth aspect, the mobility history information indicates at least one of: a cell ID associated with a reported cell of the one or more reported cells, a duration of time for which the reported cell has been detectable, or a combination thereof.

In a seventeenth aspect, alone or in combination with one or more of the first through sixteenth aspects, the one or more reported cells comprises: one or more mobile cells, one or more stationary cells, or a combination thereof.

In an eighteenth aspect, alone or in combination with one or more of the first through seventeenth aspects, the mobility history information indicates at least one of: a node ID associated with the wireless serving node, a duration of time for which the wireless serving node has been visiting a cell provided by the parent node, one or more additional node IDs associated with one or more additional child nodes of the parent node, a duration of time, corresponding to an additional child node of the one or more additional child nodes of the parent node, for which the additional child node has been connected to the cell provided by the parent node, or a combination thereof.

In a nineteenth aspect, alone or in combination with one or more of the first through eighteenth aspects, the mobility history information indicates mobility state information associated with the parent node.

In a twentieth aspect, alone or in combination with the nineteenth aspect, the mobility state information associated with the parent node indicates at least one of: a node ID associated with the wireless serving node, a duration of time for which the wireless serving node has been visiting a cell provided by the parent node, one or more additional node IDs associated with one or more additional child nodes of the parent node, a duration of time, corresponding to an additional child node of the one or more additional child nodes of the parent node, for which the additional child node has been connected to the cell provided by the parent node, or a combination thereof.

In a twenty-first aspect, alone or in combination with one or more of the nineteenth through twentieth aspects, the mobility state information associated with the parent node comprises historical mobility state information.

In a twenty-second aspect, alone or in combination with the twenty-first aspect, the historical mobility state information indicates at least one of: a change in a motion state of a cell provided by the parent node, wherein the motion state indicates whether the cell provided by the parent node is mobile or stationary, a time corresponding to the change in the motion state of the cell provided by the parent node, a change in a level of mobility of the cell provided by the parent node, a time corresponding to the change in the level of mobility of the cell provided by the parent node, or a combination thereof.

In a twenty-third aspect, alone or in combination with one or more of the nineteenth through twenty-second aspects, the mobility state information associated with the parent node comprises planned mobility state information.

In a twenty-fourth aspect, alone or in combination with the twenty-third aspect, the planned mobility state information indicates at least one of: a duration of time that a cell provided by the parent node will have a current motion state, a minimum duration of time that the cell provided by the parent node will have a current motion state, a maximum duration of time that the cell provided by the parent node will have a current motion state, a next motion state to which the cell provided by the parent node will change, a duration of time that the cell provided by the parent node will have the next motion state, a minimum duration of time that the cell provided by the parent node will have the next motion state, a maximum duration of time that the cell provided by the parent node will have the next motion state, a duration of time that the cell provided by the parent node will have a current level of mobility, a next level of mobility to which the cell provided by the parent node will change, a duration of time that the cell provided by the parent node will have the next level of mobility, a minimum duration of time that the cell provided by the parent node will have the next level of mobility, a maximum duration of time that the cell provided by the parent node will have the next level of mobility, or a combination thereof.

In a twenty-fifth aspect, alone or in combination with one or more of the twenty-third through twenty-fourth aspects, the planned mobility state information indicates at least one of: motion direction information associated with a cell provided by the parent node, a cell ID associated with a next expected cell to be visited by the parent node, or a combination thereof.

In a twenty-sixth aspect, alone or in combination with the twenty-fifth aspect, the next expected cell is determined based at least in part on motion direction information associated with repeated travel along a particular route.

In a twenty-seventh aspect, alone or in combination with one or more of the first through twenty sixth aspects, process 700 includes receiving an indication of a change to the mobility history information.

In a twenty-eighth aspect, alone or in combination with the twenty-seventh aspect, the indication of the change to the mobility history information is carried in at least one of: DCI, a MAC-CE, or a combination thereof.

In a twenty-ninth aspect, alone or in combination with one or more of the twenty-seventh through twenty-eighth aspects, the mobility history information is carried in a SIB, and the indication of the change to the mobility history information is carried in a dedicated SI update.

In a thirtieth aspect, alone or in combination with the twenty-ninth aspect, the dedicated SI update is transmitted to: each child node of a set of child nodes of the parent node, or a subset of the set of child nodes of the parent nodes, wherein the subset of the set of child nodes includes fewer than all of the child nodes of the set of child nodes.

In a thirty-first aspect, alone or in combination with one or more of the twenty-ninth through thirtieth aspects, the dedicated SI update is transmitted using a short message.

In a thirty-second aspect, alone or in combination with the thirty-first aspect, the dedicated SI update is transmitted using an extended SI update indication.

In a thirty-third aspect, alone or in combination with the thirty-second aspect, the extended SI update indication comprises a dedicated short message.

In a thirty-fourth aspect, alone or in combination with one or more of the twenty-ninth through thirty-third aspects, the extended SI update indication comprises at least one of: a dedicated paging RNTI, one or more dedicated PDCCH resources, dedicated content of a legacy short message, a legacy short message in which one or more reserved bits are used for the dedicated SI update, a legacy short message in which one or more unused bits are used for the dedicated SI update, or a combination thereof.

In a thirty-fifth aspect, alone or in combination with one or more of the thirty-third through thirty-fourth aspects, the extended SI update indication is carried in a paging PDSCH.

In a thirty-sixth aspect, alone or in combination with the thirty-fifth aspect, the extended SI update indication indicates the SIB that has been updated.

In a thirty-seventh aspect, alone or in combination with one or more of the thirty-fifth through thirty-sixth aspects, the change to the mobility history information is explicitly indicated in the paging PDSCH.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a wireless serving node in a network, comprising: determining mobility history information associated with the wireless serving node, wherein the mobility history information is associated with a relative mobility between the wireless serving node and one or more reported cells; and transmitting, to a second wireless node, the mobility history information associated with the wireless serving node.

Aspect 2: The method of Aspect 1, wherein the wireless serving node determines the mobility history information based at least in part on the wireless serving node comprising a distributed unit of a wireless integrated access and backhaul node.

Aspect 3: The method of either of Aspects 1 or 2, wherein the wireless serving node is a mobile wireless node, and wherein the wireless serving node determines the mobility history information based at least in part on the wireless serving node comprising a distributed unit of a mobile wireless integrated access and backhaul node.

Aspect 4: The method of any of Aspects 1-3, wherein transmitting the mobility history information comprises broadcasting the mobile history information in a system information block (SIB).

Aspect 5: The method of Aspect 4, wherein the SIB comprises a legacy SIB or a dedicated SIB.

Aspect 6: The method of any of Aspects 1-5, further comprising transmitting an indication that the mobility history information is available.

Aspect 7: The method of Aspect 6, wherein the indication is carried in a system information block (SIB).

Aspect 8: The method of Aspect 7, wherein the SIB comprises a SIB 1.

Aspect 9: The method of any of Aspects 1-8, wherein the second wireless node comprises a child node of the wireless serving node, wherein transmitting the mobility history information to the child node comprises transmitting the mobility history information to a subset of child nodes, of a set of child nodes, of the wireless serving node, wherein the subset of child nodes comprises fewer than all of the child nodes in the set of child nodes.

Aspect 10: The method of Aspect 9, wherein the subset of child nodes comprises one or more child integrated access and backhaul nodes of the set of child nodes.

Aspect 11: The method of any of Aspects 1-10, wherein the mobility history information is carried in a radio resource control message.

Aspect 12: The method of any of Aspects 1-11, wherein the wireless serving node is a mobile wireless integrated access and backhaul node, and wherein the one or more reported cells comprise one or more visited cells.

Aspect 13: The method of any of Aspects 1-12, wherein the wireless serving node is a mobile wireless integrated access and backhaul node, and wherein the one or more reported cells comprise one or more cells on which the wireless serving node camped, wherein the one or more cells on which the wireless serving node camped comprise one or more cells that the wireless serving node visited for a duration of time that satisfies a camping threshold.

Aspect 14: The method of any of Aspects 1-13, wherein the mobility history information indicates at least one of: a cell identifier associated with a reported cell of the one or more reported cells, a duration of time for which the wireless serving node visited the reported cell, an entry time corresponding to a time at which the wireless serving node entered the reported cell, an exit time corresponding to a time at which the wireless serving node exited the reported cell, mobility state information associated with the reported cell, or a combination thereof.

Aspect 15: The method of any of Aspects 1-14, wherein the mobility history information indicates at least one of: a cell identifier associated with a reported cell of the one or more reported cells, a motion state of the reported cell, wherein the motion state indicates whether the reported cell is mobile or stationary, a level of mobility of the reported cell, or a combination thereof.

Aspect 16: The method of any of Aspects 1-15, wherein the one or more reported cells comprise one or more detected neighboring cells, wherein the one or more detected neighboring cells comprise cells neighboring a cell provided by the wireless serving node and that are detected by the wireless serving node.

Aspect 17: The method of Aspect 16, wherein the mobility history information indicates at least one of: a cell identifier associated with a reported cell of the one or more reported cells, a duration of time for which the reported cell has been detectable, or a combination thereof.

Aspect 18: The method of any of Aspects 1-17, wherein the one or more reported cells comprises: one or more mobile cells, one or more stationary cells, or a combination thereof.

Aspect 19: The method of any of Aspects 1-18, wherein the second wireless node comprises a child node of the wireless serving node, and wherein the mobility history information indicates at least one of: a node identifier (ID) associated with the child node, a duration of time for which the child node has been visiting a cell provided by the wireless serving node, one or more additional node IDs associated with one or more additional child nodes of the wireless serving node, a duration of time, corresponding to an additional child node of the one or more additional child nodes of the wireless serving node, for which the additional child node has been connected to the cell provided by the wireless serving node, or a combination thereof.

Aspect 20: The method of any of Aspects 1-19, wherein the mobility history information indicates mobility state information associated with the wireless serving node.

Aspect 21: The method of Aspect 20, wherein the mobility state information associated with the wireless serving node indicates at least one of: a motion state of a cell provided by the wireless serving node, wherein the motion state indicates whether the cell provided by the wireless serving node is mobile or stationary, a level of mobility of the cell provided by the wireless serving node, or a combination thereof.

Aspect 22: The method of either of Aspects 20 or 21, wherein the mobility state information associated with the wireless serving node comprises historical mobility state information.

Aspect 23: The method of Aspect 22, wherein the historical mobility state information indicates at least one of: a change in a motion state of a cell provided by the wireless serving node, wherein the motion state indicates whether the cell provided by the wireless serving node is mobile or stationary, a time corresponding to the change in the motion state of the cell provided by the wireless serving node, a change in a level of mobility of the cell provided by the wireless serving node, a time corresponding to the change in the level of mobility of the cell provided by the wireless serving node, or a combination thereof.

Aspect 24: The method of any of Aspects 20-23, wherein the mobility state information associated with the wireless serving node comprises planned mobility state information.

Aspect 25: The method of Aspect 24, wherein the planned mobility state information indicates at least one of: a duration of time that a cell provided by the wireless serving node will have a current motion state, a minimum duration of time that the cell provided by the wireless serving node will have a current motion state, a maximum duration of time that the cell provided by the wireless serving node will have a current motion state, a next motion state to which the cell provided by the wireless serving node will change, a duration of time that the cell provided by the wireless serving node will have the next motion state, a minimum duration of time that the cell provided by the wireless serving node will have the next motion state, a maximum duration of time that the cell provided by the wireless serving node will have the next motion state, a duration of time that the cell provided by the wireless serving node will have a current level of mobility, a next level of mobility to which the cell provided by the wireless serving node will change, a duration of time that the cell provided by the wireless serving node will have the next level of mobility, a minimum duration of time that the cell provided by the wireless serving node will have the next level of mobility, a maximum duration of time that the cell provided by the wireless serving node will have the next level of mobility, or a combination thereof.

Aspect 26: The method of either of Aspects 24 or 25, wherein the planned mobility state information indicates at least one of: motion direction information associated with a cell provided by the wireless serving node, a cell identifier associated with a next expected cell to be visited by the wireless serving node, or a combination thereof.

Aspect 27: The method of Aspect 26, further comprising determining the next expected cell based at least in part on motion direction information associated with repeated travel, by the wireless serving node, along a particular route.

Aspect 28: The method of any of Aspects 1-27, further comprising transmitting an indication of a change to the mobility history information.

Aspect 29: The method of Aspect 28, wherein the indication of the change to the mobility history information is carried in at least one of: downlink control information, a medium access control (MAC) control element, or a combination thereof.

Aspect 30: The method of either of Aspects 28 or 29, wherein the mobility history information is carried in a system information block (SIB), and wherein the indication of the change to the mobility history information is carried in a dedicated system information (SI) update.

Aspect 31: The method of Aspect 30, wherein the dedicated SI update is transmitted to: each child node of a set of child nodes of the wireless serving node, or a subset of the set of child nodes of the wireless serving node, wherein the subset of the set of child nodes includes fewer than all of the child nodes of the set of child nodes.

Aspect 32: The method of either of Aspects 30 or 31, wherein the dedicated SI update is transmitted using a short message.

Aspect 33: The method of any of Aspects 30-32, wherein the dedicated SI update is transmitted using an extended SI update indication.

Aspect 34: The method of Aspect 33, wherein the extended SI update indication comprises a dedicated short message.

Aspect 35: The method of Aspect 34, wherein the extended SI update indication comprises at least one of: a dedicated paging radio network temporary identifier, one or more dedicated physical downlink control channel resources, dedicated content of a legacy short message, a legacy short message in which one or more reserved bits are used for the dedicated SI update, a legacy short message in which one or more unused bits are used for the dedicated SI update, or a combination thereof.

Aspect 36: The method of either of Aspects 34 or 35, wherein the extended SI update indication is carried in a paging physical downlink shared channel (PDSCH).

Aspect 37: The method of Aspect 36, wherein the extended SI update indication indicates the SIB that has been updated.

Aspect 38: The method of either of Aspects 36 or 37, wherein the change to the mobility history information is explicitly indicated in the paging PDSCH.

Aspect 39: A method of wireless communication performed by a wireless serving node in a network, comprising: receiving, from a parent node of the wireless serving node, mobility history information associated with the parent node, wherein the mobility history information is associated with a relative mobility between the parent node and one or more reported cells; and performing an action based at least in part on receiving the mobility history information associated with the parent node.

Aspect 40: The method of Aspect 39, wherein the parent node determines the mobility history information based at least in part on the parent node comprising a distributed unit of a wireless integrated access and backhaul node.

Aspect 41: The method of either of Aspects 39 or 40, wherein the parent node is a mobile wireless node, and wherein the parent node determines the mobility history information based at least in part on the parent node comprising a distributed unit of a mobile wireless integrated access and backhaul node.

Aspect 42: The method of any of Aspects 39-41, wherein the mobility history information is broadcast in a system information block (SIB).

Aspect 43: The method of Aspect 42, wherein the SIB comprises a legacy SIB or a dedicated SIB.

Aspect 44: The method of any of Aspects 39-43, further comprising receiving an indication that the mobility history information is available.

Aspect 45: The method of Aspect 44, wherein the indication is carried in a system information block (SIB).

Aspect 46: The method of Aspect 45, wherein the SIB comprises a SIB 1.

Aspect 47: The method of any of Aspects 39-46, wherein the wireless serving node comprises a child node of a subset of child nodes, of a set of child nodes, of the parent node, wherein the subset of child nodes comprises fewer than all of the child nodes in the set of child nodes.

Aspect 48: The method of Aspect 47, wherein the subset of child nodes comprises one or more child integrated access and backhaul nodes of the set of child nodes.

Aspect 49: The method of any of Aspects 39-48, wherein the mobility history information is carried in a radio resource control message.

Aspect 50: The method of any of Aspects 39-49, wherein the parent node is a mobile wireless integrated access and backhaul node, and wherein the one or more reported cells comprise one or more visited cells.

Aspect 51: The method of any of Aspects 39-50, wherein the parent node is a mobile wireless integrated access and backhaul node, and wherein the one or more reported cells comprise one or more cells on which the parent node camped, wherein the one or more cells on which the parent node camped comprise one or more cells that the parent node visited for a duration of time that satisfies a camping threshold.

Aspect 52: The method of any of Aspects 39-51, wherein the mobility history information indicates at least one of: a cell identifier associated with a reported cell of the one or more reported cells, a duration of time for which the parent node visited the reported cell, an entry time corresponding to a time at which the parent node entered the reported cell, an exit time corresponding to a time at which the parent node exited the reported cell, mobility state information associated with the reported cell, or a combination thereof.

Aspect 53: The method of any of Aspects 39-52, wherein the mobility history information indicates at least one of: a cell identifier associated with a reported cell of the one or more reported cells, a motion state of the reported cell, wherein the motion state indicates whether the reported cell is mobile or stationary, a level of mobility of the reported cell, or a combination thereof.

Aspect 54: The method of any of Aspects 39-53, wherein the one or more reported cells comprise one or more detected neighboring cells, wherein the one or more detected neighboring cells comprise cells neighboring a cell provided by the parent node and that are detected by the parent node.

Aspect 55: The method of Aspect 54, wherein the mobility history information indicates at least one of: a cell identifier associated with a reported cell of the one or more reported cells, a duration of time for which the reported cell has been detectable, or a combination thereof.

Aspect 56: The method of any of Aspects 39-55, wherein the one or more reported cells comprises: one or more mobile cells, one or more stationary cells, or a combination thereof.

Aspect 57: The method of any of Aspects 39-56, wherein the mobility history information indicates at least one of: a node identifier (ID) associated with the wireless serving node, a duration of time for which the wireless serving node has been visiting a cell provided by the parent node, one or more additional node IDs associated with one or more additional child nodes of the parent node, a duration of time, corresponding to an additional child node of the one or more additional child nodes of the parent node, for which the additional child node has been connected to the cell provided by the parent node, or a combination thereof.

Aspect 58: The method of any of Aspects 39-57, wherein the mobility history information indicates mobility state information associated with the parent node.

Aspect 59: The method of Aspect 58, wherein the mobility state information associated with the parent node indicates at least one of: a motion state of a cell provided by the parent node, wherein the motion state indicates whether the cell provided by the parent node is mobile or stationary, a level of mobility of the cell provided by the parent node, or a combination thereof.

Aspect 60: The method of either of Aspects 58 or 59, wherein the mobility state information associated with the parent node comprises historical mobility state information.

Aspect 61: The method of Aspect 60, wherein the historical mobility state information indicates at least one of: a change in a motion state of a cell provided by the parent node, wherein the motion state indicates whether the cell provided by the parent node is mobile or stationary, a time corresponding to the change in the motion state of the cell provided by the parent node, a change in a level of mobility of the cell provided by the parent node, a time corresponding to the change in the level of mobility of the cell provided by the parent node, or a combination thereof.

Aspect 62: The method of any of Aspects 58-61, wherein the mobility state information associated with the parent node comprises planned mobility state information.

Aspect 63: The method of Aspect 62, wherein the planned mobility state information indicates at least one of: a duration of time that a cell provided by the parent node will have a current motion state, a minimum duration of time that the cell provided by the parent node will have a current motion state, a maximum duration of time that the cell provided by the parent node will have a current motion state, a next motion state to which the cell provided by the parent node will change, a duration of time that the cell provided by the parent node will have the next motion state, a minimum duration of time that the cell provided by the parent node will have the next motion state, a maximum duration of time that the cell provided by the parent node will have the next motion state, a duration of time that the cell provided by the parent node will have a current level of mobility, a next level of mobility to which the cell provided by the parent node will change, a duration of time that the cell provided by the parent node will have the next level of mobility, a minimum duration of time that the cell provided by the parent node will have the next level of mobility, a maximum duration of time that the cell provided by the parent node will have the next level of mobility, or a combination thereof.

Aspect 64: The method of either of Aspects 62 or 63, wherein the planned mobility state information indicates at least one of: motion direction information associated with a cell provided by the parent node, a cell identifier associated with a next expected cell to be visited by the parent node, or a combination thereof.

Aspect 65: The method of Aspect 64, wherein the next expected cell is determined based at least in part on motion direction information associated with repeated travel, by the parent node, along a particular route.

Aspect 66: The method of any of Aspects 39-65, further comprising receiving an indication of a change to the mobility history information.

Aspect 67: The method of Aspect 66, wherein the indication of the change to the mobility history information is carried in at least one of: downlink control information, a medium access control (MAC) control element, or a combination thereof.

Aspect 68: The method of either of Aspects 66 or 67, wherein the mobility history information is carried in a system information block (SIB), and wherein the indication of the change to the mobility history information is carried in a dedicated system information (SI) update.

Aspect 69: The method of Aspect 68, wherein the dedicated SI update is transmitted to: each child node of a set of child nodes of the parent node, or a subset of the set of child nodes of the parent nodes, wherein the subset of the set of child nodes includes fewer than all of the child nodes of the set of child nodes.

Aspect 70: The method of either of Aspects 68 or 69, wherein the dedicated SI update is transmitted using a short message.

Aspect 71: The method of Aspect 70, wherein the dedicated SI update is transmitted using an extended SI update indication.

Aspect 72: The method of Aspect 71, wherein the extended SI update indication comprises a dedicated short message.

Aspect 73: The method of Aspect 72, wherein the extended SI update indication comprises at least one of: a dedicated paging radio network temporary identifier, one or more dedicated physical downlink control channel resources, dedicated content of a legacy short message, a legacy short message in which one or more reserved bits are used for the dedicated SI update, a legacy short message in which one or more unused bits are used for the dedicated SI update, or a combination thereof.

Aspect 74: The method of either of Aspects 72 or 73, wherein the extended SI update indication is carried in a paging physical downlink shared channel (PDSCH).

Aspect 75: The method of Aspect 74, wherein the extended SI update indication indicates the SIB that has been updated.

Aspect 76: The method of either of Aspects 74 or 75, wherein the change to the mobility history information is explicitly indicated in the paging PDSCH.

Aspect 77: An apparatus for wireless communication at a device, comprising a processor; memory coupled with the processor; and instructions stored in the memory and executable by the processor to cause the apparatus to perform the method of one or more Aspects of Aspects 1-38.

Aspect 78: A device for wireless communication, comprising a memory and one or more processors coupled to the memory, the memory and the one or more processors configured to perform the method of one or more Aspects of Aspects 1-38.

Aspect 79: An apparatus for wireless communication, comprising at least one means for performing the method of one or more Aspects of Aspects 1-38.

Aspect 80: A non-transitory computer-readable medium storing code for wireless communication, the code comprising instructions executable by a processor to perform the method of one or more Aspects of Aspects 1-38.

Aspect 81: A non-transitory computer-readable medium storing a set of instructions for wireless communication, the set of instructions comprising one or more instructions that, when executed by one or more processors of a device, cause the device to perform the method of one or more Aspects of Aspects 1-38.

Aspect 82: An apparatus for wireless communication at a device, comprising a processor; memory coupled with the processor; and instructions stored in the memory and executable by the processor to cause the apparatus to perform the method of one or more Aspects of Aspects 39-76.

Aspect 83: A device for wireless communication, comprising a memory and one or more processors coupled to the memory, the memory and the one or more processors configured to perform the method of one or more Aspects of Aspects 39-76.

Aspect 84: An apparatus for wireless communication, comprising at least one means for performing the method of one or more Aspects of Aspects 39-76.

Aspect 85: A non-transitory computer-readable medium storing code for wireless communication, the code comprising instructions executable by a processor to perform the method of one or more Aspects of Aspects 39-76.

Aspect 86: A non-transitory computer-readable medium storing a set of instructions for wireless communication, the set of instructions comprising one or more instructions that, when executed by one or more processors of a device, cause the device to perform the method of one or more Aspects of Aspects 39-76.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless node comprising a wireless serving node for wireless communication, comprising:
   a memory; and
   one or more processors coupled to the memory, the one or more processors configured to cause the wireless serving node to:
      determine mobility history information associated with the wireless serving node, wherein the mobility history information is associated with a previous relative mobility between the wireless serving node and one or more reported cells; and
      transmit, to a second wireless node in a radio resource control (RRC) message, the mobility history information associated with the wireless serving node, wherein the mobility history information comprises an indication of the one or more reported cells, wherein the one or more reported cells comprise one or more cells on which the wireless serving node has previously camped.

2. The wireless serving node of claim 1, wherein the wireless serving node determines the mobility history information based at least in part on the wireless serving node comprising a distributed unit of a wireless integrated access and backhaul node.

3. The wireless serving node of claim 1, wherein the wireless serving node is a mobile wireless node, and wherein the wireless serving node determines the mobility history information based at least in part on the wireless serving node comprising a distributed unit of a mobile wireless integrated access and backhaul node.

4. The wireless serving node of claim 1, wherein transmitting the mobility history information comprises broadcasting the mobile history information in a system information block (SIB), wherein the SIB comprises a legacy SIB or a dedicated SIB.

5. The wireless serving node of claim 1, wherein the one or more processors are further configured to cause the wireless serving node to transmit an indication that the mobility history information is available.

6. The wireless serving node of claim 5, wherein the indication is carried in a system information block (SIB).

7. The wireless serving node of claim 1, wherein the second wireless node comprises a child node of the wireless serving node, wherein transmitting the mobility history information to the child node comprises transmitting the mobility history information to a subset of child nodes, of a set of child nodes, of the wireless serving node, and wherein the subset of child nodes comprises fewer than all of the child nodes in the set of child nodes.

8. The wireless serving node of claim 7, wherein the subset of child nodes comprises one or more child integrated access and backhaul nodes of the set of child nodes.

9. The wireless serving node of claim 1, wherein the wireless serving node is a mobile wireless integrated access and backhaul node, and wherein the one or more reported cells comprise one or more visited cells.

10. The wireless serving node of claim 1, wherein the wireless serving node is a mobile wireless integrated access and backhaul node, and wherein the one or more cells on which the wireless serving node has previously camped comprise one or more cells that the wireless serving node visited for a duration of time that satisfies a camping threshold.

11. The wireless serving node of claim 1, wherein the mobility history information indicates at least one of:
   a cell identifier associated with a reported cell of the one or more reported cells,
   a motion state of the reported cell, wherein the motion state indicates whether the reported cell is mobile or stationary,
   a duration of time for which the wireless serving node visited the reported cell,
   an entry time corresponding to a time at which the wireless serving node entered the reported cell,
   an exit time corresponding to a time at which the wireless serving node exited the reported cell,
   a level of mobility of the reported cell,
   mobility state information associated with the reported cell, or
   a combination thereof.

12. The wireless serving node of claim 1, wherein the one or more reported cells comprise one or more detected neighboring cells, wherein the one or more detected neighboring cells comprise cells neighboring a cell provided by the wireless serving node and that are detected by the wireless serving node.

13. The wireless serving node of claim 12, wherein the mobility history information indicates at least one of:
   a cell identifier associated with a reported cell of the one or more reported cells,
   a duration of time for which the reported cell has been detectable, or
   a combination thereof.

14. The wireless serving node of claim 1, wherein the second wireless node comprises a child node of the wireless serving node, and wherein the mobility history information indicates at least one of:
   a node identifier (ID) associated with the child node,
   a duration of time for which the child node has been visiting a cell provided by the wireless serving node,
   one or more additional node IDs associated with one or more additional child nodes of the wireless serving node,
   a duration of time, corresponding to an additional child node of the one or more additional child nodes of the wireless serving node, for which the additional child node has been connected to the cell provided by the wireless serving node,
   mobility state information associated with the wireless serving node, or
   a combination thereof.

15. The wireless serving node of claim 14, wherein the mobility state information associated with the wireless serving node indicates at least one of:
   a motion state of a cell provided by the wireless serving node, wherein the motion state indicates whether the cell provided by the wireless serving node is mobile or stationary, a level of mobility of the cell provided by the wireless serving node, or a combination thereof.

16. The wireless serving node of claim 14, wherein the mobility state information associated with the wireless serving node comprises historical mobility state information, and wherein the historical mobility state information indicates at least one of:

a change in a motion state of a cell provided by the wireless serving node, wherein the motion state indicates whether the cell provided by the wireless serving node is mobile or stationary, a time corresponding to the change in the motion state of the cell provided by the wireless serving node, a change in a level of mobility of the cell provided by the wireless serving node, a time corresponding to the change in the level of mobility of the cell provided by the wireless serving node, or a combination thereof.

17. The wireless serving node of claim 14, wherein the mobility state information associated with the wireless serving node comprises planned mobility state information, and wherein the planned mobility state information indicates at least one of:

a duration of time that a cell provided by the wireless serving node will have a current motion state, a minimum duration of time that the cell provided by the wireless serving node will have a current motion state, a maximum duration of time that the cell provided by the wireless serving node will have a current motion state, a next motion state to which the cell provided by the wireless serving node will change, a duration of time that the cell provided by the wireless serving node will have the next motion state, a minimum duration of time that the cell provided by the wireless serving node will have the next motion state, a maximum duration of time that the cell provided by the wireless serving node will have the next motion state, a duration of time that the cell provided by the wireless serving node will have a current level of mobility, a next level of mobility to which the cell provided by the wireless serving node will change, a duration of time that the cell provided by the wireless serving node will have the next level of mobility, a minimum duration of time that the cell provided by the wireless serving node will have the next level of mobility, a maximum duration of time that the cell provided by the wireless serving node will have the next level of mobility, motion direction information associated with a cell provided by the wireless serving node, a cell identifier associated with a next expected cell to be visited by the wireless serving node, or a combination thereof.

18. The wireless serving node of claim 17, wherein the one or more processors are further configured to cause the wireless serving node to determine the next expected cell based at least in part on motion direction information associated with repeated travel along a particular route.

19. The wireless serving node of claim 1, wherein the one or more processors are further configured to cause the wireless serving node to transmit an indication of a change to the mobility history information.

20. The wireless serving node of claim 19, wherein the indication of the change to the mobility history information is carried in at least one of:

downlink control information, a medium access control (MAC) control element, or a combination thereof.

21. The wireless serving node of claim 19, wherein the mobility history information is carried in a system information block (SIB), and wherein the indication of the change to the mobility history information is carried in a dedicated system information (SI) update.

22. The wireless serving node of claim 21, wherein the dedicated SI update is transmitted to:

each child node of a set of child nodes of the wireless serving node, or a subset of the set of child nodes of the wireless serving node, wherein the subset of the set of child nodes includes fewer than all of the child nodes of the set of child nodes.

23. The wireless serving node of claim 21, wherein the dedicated SI update is transmitted using a short message.

24. The wireless serving node of claim 21, wherein the dedicated SI update is transmitted using an extended SI update indication.

25. The wireless serving node of claim 24, wherein the extended SI update indication comprises at least one of:

a dedicated paging radio network temporary identifier, one or more dedicated physical downlink control channel resources, dedicated content of a legacy short message, a legacy short message in which one or more reserved bits are used for the dedicated SI update, a legacy short message in which one or more unused bits are used for the dedicated SI update, or a combination thereof.

26. The wireless serving node of claim 24, wherein the extended SI update indication is carried in a paging physical downlink shared channel (PDSCH).

27. A wireless serving node for wireless communication, comprising:

a memory; and one or more processors coupled to the memory, the one or more processors configured to cause the wireless serving node to:

receive, from a parent node of the wireless serving node, in a radio resource control (RRC) message, mobility history information associated with the parent node, wherein the mobility history information is associated with a previous relative mobility between the parent node and one or more reported cells, wherein the one or more reported cells comprise one or more cells on which the wireless serving node has previously camped; and perform an action based at least in part on receiving the mobility history information associated with the parent node.

28. The wireless serving node of claim 27, wherein the wireless serving node is a mobile wireless integrated access and backhaul node, and wherein the one or more reported cells comprise one or more visited cells.

29. A method of wireless communication performed by a first wireless node comprising a wireless serving node in a network, comprising:

determining mobility history information associated with the wireless serving node, wherein the mobility history information is associated with a previous relative mobility between the wireless serving node and one or more reported cells, wherein the one or more reported cells comprise one or more cells on which the wireless serving node has previously camped; and transmitting, to a second wireless node in a radio resource control (RRC) message, the mobility history information associated with the wireless serving node, wherein the mobility history information comprises an indication of the one or more reported cells, wherein the one or more reported cells comprise one or more cells on which the wireless serving node has previously camped.

30. A method of wireless communication performed by a wireless serving node in a network, comprising:
receiving, from a parent node of the wireless serving node, in a radio resource control (RRC) message mobility history information associated with the parent node, wherein the mobility history information is associated with a previous relative mobility between the parent node and one or more reported cells, wherein the one or more reported cells comprise one or more cells on which the wireless serving node has previously camped; and
performing an action based at least in part on receiving the mobility history information associated with the parent node.

* * * * *